(12) United States Patent
George et al.

(10) Patent No.: US 9,870,215 B2
(45) Date of Patent: Jan. 16, 2018

(54) TRACKING AN APPLICATION INSTALLATION STATE

(71) Applicant: International Business Machines Corporation, Armonk, NY (US)

(72) Inventors: Manu T. George, Bangalore (IN); Anoop G. M. Ramachandra, Mysore (IN); Murali K. Surampalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/953,489

(22) Filed: Nov. 30, 2015

(65) Prior Publication Data

US 2017/0153879 A1     Jun. 1, 2017

(51) Int. Cl.
| | |
|---|---|
| G06F 9/445 | (2006.01) |
| H04B 5/00 | (2006.01) |
| H04W 4/02 | (2009.01) |
| G06Q 20/10 | (2012.01) |
| G06Q 20/40 | (2012.01) |
| G06F 21/30 | (2013.01) |
| G06F 11/30 | (2006.01) |

(52) U.S. Cl.
CPC ............ *G06F 8/61* (2013.01); *H04B 5/0062* (2013.01); *H04W 4/021* (2013.01); *G06F 11/3051* (2013.01); *G06F 21/30* (2013.01); *G06Q 20/1085* (2013.01); *G06Q 20/409* (2013.01)

(58) Field of Classification Search
None
See application file for complete search history.

(56) References Cited

U.S. PATENT DOCUMENTS

| | | | |
|---|---|---|---|
| 8,463,884 B2 | 6/2013 | Clinton et al. | |
| 2011/0288932 A1 | 11/2011 | Marks et al. | |
| 2014/0171116 A1 | 6/2014 | LaMarca et al. | |
| 2015/0365486 A1* | 12/2015 | Kotecha | H04L 67/18 455/414.1 |

(Continued)

FOREIGN PATENT DOCUMENTS

| | | |
|---|---|---|
| CN | 102736978 A | 10/2012 |
| CN | 103473163 A | 12/2013 |
| CN | 105824656 A | 8/2016 |

OTHER PUBLICATIONS

Mell et al., "The NIST Definition of Cloud Computing", National Institute of Standards and Technology, Special Publication 800-145, Sep. 2011, 7 pages.

*Primary Examiner* — H S Sough
*Assistant Examiner* — Timothy Duncan
(74) *Attorney, Agent, or Firm* — L. Jeffrey Kelly (57) ABSTRACT

An apparatus, method, and system for receiving a request for a transaction using a computer system. An absence of a first user identification of an application on a first user device is determined, when a beacon of the computer system does not detect the first user identification within a defined geographical area. A plurality of transaction data from a transaction device is received. A second user identification based on the received transaction data is generated. An installation status of the application on the first user device based on the generated second user identification and the absence of the first user identification is also generated.

19 Claims, 5 Drawing Sheets

(56) References Cited

U.S. PATENT DOCUMENTS

| | | | |
|---|---|---|---|
| 2016/0014552 A1* | 1/2016 | Hanson | H04W 4/02 |
| | | | 455/456.3 |
| 2016/0189159 A1* | 6/2016 | Luk | G06Q 20/3224 |
| | | | 705/39 |
| 2016/0342979 A1* | 11/2016 | Joshi | G06Q 20/18 |
| 2017/0076306 A1* | 3/2017 | Snider | G06Q 30/0205 |

* cited by examiner

TRACKING AN APPLICATION INSTALLATION STATE

BACKGROUND

The present invention relates generally to the field of mobile applications, and more particularly to using point of transactions and trusted locations to track mobile application install status on a mobile device.

Enterprises interaction with customers in the mobile application space may require industry to engage with their customers through proprietary mobile applications. An important metric for application developers is to track the download count and active user count. The download count may not reflect the number of users that have the application installed as uninstalling the application will not diminish the download count. Application activity may be tracked but may not provide the most accurate information as inactive users may not be captured within a certain time period of tracking. It is known in the art that Push notifications are used to detect installation rates of applications. Push notifications may be sent to devices at regular intervals and if the user has uninstalled the application, the Push notification service informs the server that the Push notification was unsuccessful. However, this may occur when the application is uninstalled, when a user deactivated Push notifications for that application, even if the application is installed, or if the device is turned off. Regular interval Push notifications may also drive customers to turn off Push notifications or uninstall the application.

SUMMARY

In one embodiment according to the invention, it would be advantageous to have a dynamic server or database in which the installation status of an enterprise mobile application is known without a notification or confirmation from a user. Embodiments of the present invention disclose an apparatus, method, and system for receiving a request for a transaction using a computer system. An absence of a first user identification of an application on a first user device is determined, when a beacon of the computer system does not detect the first user identification within a defined geographical area. A plurality of transaction data from a transaction device is received. A second user identification based on the received transaction data is generated. An installation status of the application on the first user device based on the generated second user identification and the absence of the first user identification is also generated.

DETAILED DESCRIPTION

Detailed embodiments of the claimed structures and methods are disclosed herein; however, it is understood that the disclosed embodiments are merely illustrative of the claimed structures and methods that may be embodied in various forms. The invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many mobile application developers may engage customers about the details of accounts and transactions made. For example, a bank may create a mobile application that customers can use to be informed of account information, transaction history, etc. The use of the application by customers may be advantageous in order to, for example, advertise new services or provide services that may alleviate traffic at physical bank locations. Tracking installation rates may performed by correlating user transactions, at a transaction device, or beacon detecting an area of trust, to determine the installation status of an application on a user device.

Figure 1:
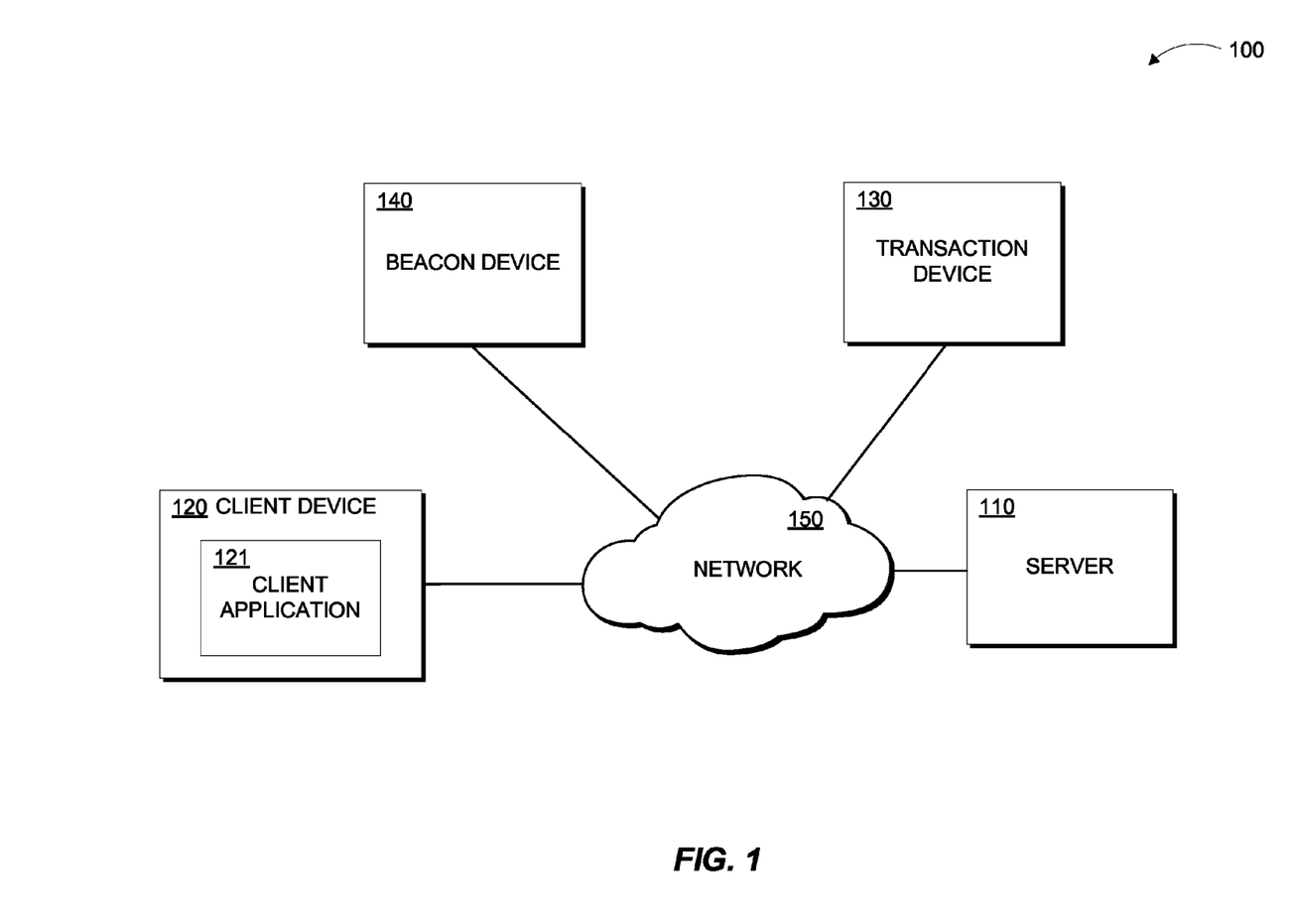
FIG. 1 is a functional block diagram illustrating a distributed data processing environment, in accordance with an embodiment of the present invention.

The present invention will now be described in detail with reference to the Figures. Referring to FIG. 1, a distributed data processing environment 100 is shown, in accordance with one embodiment of the present invention. Distributed data processing environment 100 includes server 110, client device 120, transaction device 130, and beacon device 140, all interconnected through network 150.

Network 150 may include permanent connections, such as wire or fiber optic cables, or temporary connections made through telephone or wireless communications. Network 150 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 150 may also include a number of different types of networks, such as, for example, an intranet, a local area network (LAN), or a wide area network (WAN).

Each of server 110, client device 120, transaction device 130, and beacon device 140 may be a laptop computer, tablet computer, netbook computer, personal computer (PC), desktop computer, smart phone, or any programmable electronic device capable of an exchange of data packets with other electronic devices, for example, through a network adapter, in accordance with an embodiment of the invention, and which may be described generally with respect to FIG. 3 below. In various embodiments, server 110 may be a separate server or series of servers, a database, or other data storage, internal or external to client device 120, transaction device 130, and beacon device 140. Additionally, server 110 may include any computer readable storage media accessible via network 150. Server 110, client device 120, transaction device 130, and beacon device 140, may be any programmable electronic device capable of communicating with computing devices via network 150 and with various components and devices within of distributed data processing environment 100.

Client device 120 may acts generally to host an application, capable of display in a graphical user interface, or GUI, or communicate over a network, for example network 150, via a web browser. In various embodiments of the invention, client device 120 may act generally to communicate with other computing devices within distributed data processing environment 100. Client device 120 may include client application 121.

Client application 121 may operate generally to communicate with various computing devices within distributed data processing environment 100. Client application 121 may communicate with beacon device 140, over network 150, in order to determine an installation status of client application 121.

Beacon device 140 may act generally to detect client devices, for example client device 120, within a restricted geographical area, and communicate with computing devices, for example server 110, transaction device 130, or client device 120. In response to client device 120 entering a geographic location around beacon device 140, beacon device 140 may query client device 120 in order to determine if an application, for example, client application 121, is installed. The geographic location may be restricted by a predetermined limit or by the capabilities of beacon device 140, for example, beacon device 140 may be a radio frequency beacon with a 400 ft radial range. In response to determining that client application 121 is installed on client device 120, beacon device 140 may generate a user identification (ID) for client device 120 and communicate the ID, or beacon ID to server 110.

Transaction device 130 may act generally to receive transaction requests, user identifications, and communicate with computing devices within of distributed data processing environment 100. Transaction device 130 may receive a transaction request from a user via an input to transaction device 130 as described in reference to FIG. 3. A transaction request may include a transaction identification in order to authorize the transaction. For example, transaction device 130, for example, a bank automated teller machine (ATM) may receive a transaction request for a balance inquiry. In response to requesting an identification to authorize the transaction request, the ATM may receive a transaction identification, for example, a personal identification number or PIN number. Transaction device 130 may communicate the received transaction identification (ID) to server 110.

In various embodiments, beacon device 140 may be located within transaction device 130. For example, beacon device 140 may be a radio frequency beacon located within an ATM. Beacon device 140 may include a user interface that may receive the transaction request, as described above. The user interface may be located within transaction device 130 and communicate with a remote server, for example, server 110.

Server 110 may act generally to receive communications from computing devices within distributed data processing environment 100. In various embodiments of the present invention, server 110 may a receive beacon ID from beacon device 140 and a transaction ID from transaction device 130.

Server 110 may store received beacon ID's and transaction ID's in a data store in memory and index received ID's and associate the received ID's with a generated user profile. Server 110 may compare the user identification associated with the received beacon ID and the user identification associated with the received transaction ID. In response to determining the user identifications are matching, server 110 may generate an application installation status for the generated user profile and may set the installation status as "true." In various embodiments, server 110 may receive a transaction ID from transaction device 130 and no beacon ID from beacon device 140. Server 110 may compare the received transaction ID and the beacon ID, however, since the beacon ID was not received it will return a null value and the transaction ID and beacon ID will not match. In response to the beacon ID and transaction ID not matching, server 110 may generate or modify the application installation status as "false."

In various embodiments, server 110 may continuously or periodically update the application installation status associated with a user profile. In additional embodiments the application installation status may be checked whenever transaction data is received from transaction device 130, in response to a transaction being performed by a user. In various embodiments the application installation status associated with user profiles may be communicated to a device or additional application, which may be a part of or separate from server 110, for further processing or storage.

Figure 2:
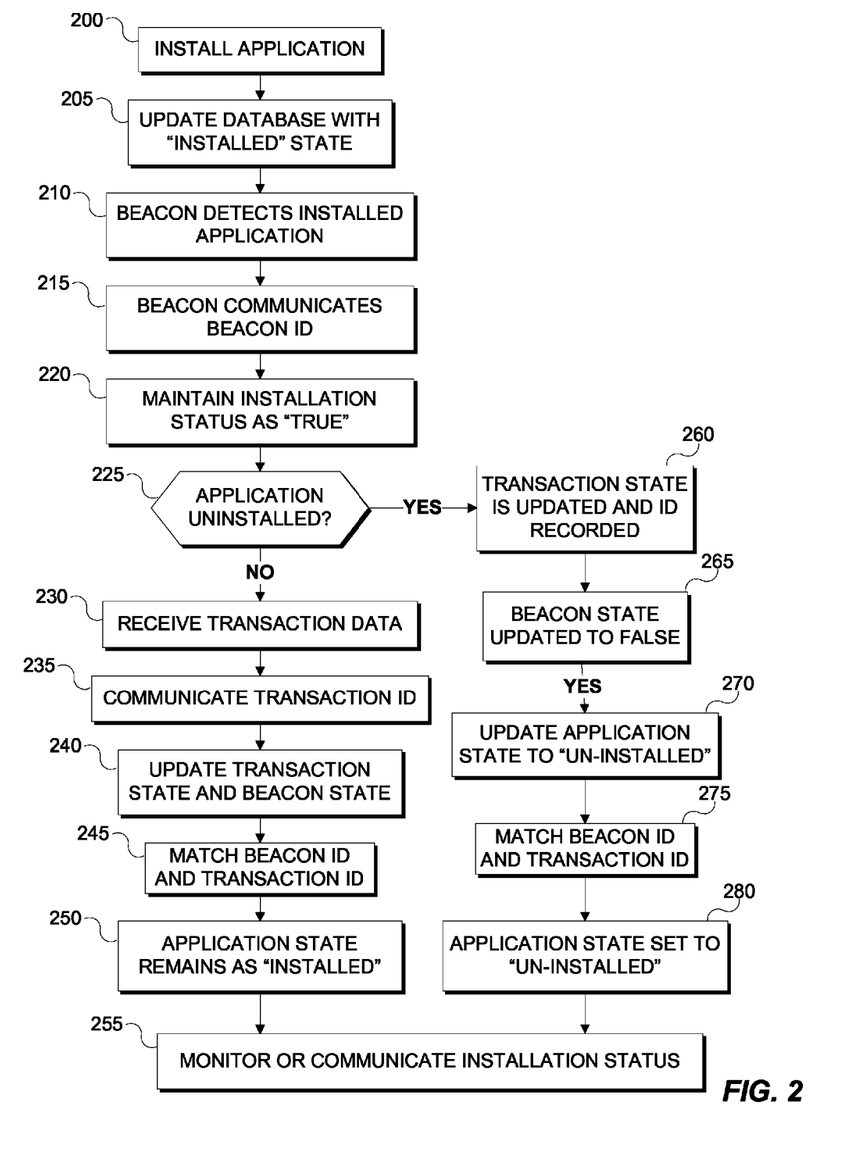
FIG. 2 is a flowchart depicting operational steps of a computer device within the data processing environment of FIG. 1, in accordance with an embodiment of the present invention.

Referring to FIG. 2, operational steps of an application on a computer device within the data processing environment of FIG. 1 is shown, in accordance with an embodiment of the present invention.

Referring to FIGS. 1 and 2, in step 200, an application is installed, for example client application 121 is installed on client device 120. A backend database, for example server 110, will have installation states or user profiles maintained for every user associated with a download of client application 121 and have an initial installation state as "true," where a true installation state means client application 121 is installed on client device 120. The user profiles maintained on server 110 may have three fields, application install status, which indicates if the application is installed or uninstalled, transaction state, which indicates if the user performed a transaction at transaction device 130, and/or a beacon state which indicates if the beacon has detected a user with client application 121 installed when on client device 120 when the user enters a geographic area around beacon 104.

In step 205, the user profile maintained on server 110 is updated with one of the three aforementioned states and, when the user installs the application, server 110 is updated with an application installed status of "true." In step 210, an installed application, for example, client application 121, is detected by a beacon, for example beacon device 140. The detection area or point of transaction may be a geographic area around the beacon and may be located near transaction device 130. The geographic area may represent the effective detectable area capable of beacon device 140. Transaction device 130 may be, for example, an ATM, as described above. In various embodiments, for example, in retail, the transaction device 130 may be the stores point of sale cash register.

In step 215, beacon device 140 communicates a beacon ID associated with the client device 120, which was detected to have installed client application 121, to server 110. Server 110 maintains the application installation status as "true," in step 220. If client application 121 remains installed, in decision step 225 "NO" branch, and beacon device 140 receives transaction data or a transaction request as described above, in step 230. A transaction is performed by a user in possession of client device 120 with client application 121 installed and a transaction ID is communicated to server 110, in step 235. Client application 121 queries server 110 via programmed triggers, defined around the transaction, that update the transaction state of server 110 to "true" and the beacon state of beacon device 140 to "true," in step 240. In response to the transaction state and beacon state being "true," Server 110 compares the received transaction ID and beacon ID, in step 245, and in step 250, the application state of client application 121 on client device 120 remains as an "installed" or "true" state in a profile associated with the user on server 110. The application installation status is monitored or communicated in step 255.

In decision step 225 "YES" branch, transaction data, including a transaction ID, is received but client application 121 is not installed on client device 120. The transaction state associated with the user is updated to "true" and transaction ID is recorded in step 260. Server 110 receives transaction data from transaction device 130 but no beacon ID from beacon device 140 and the beacon state is updated to false, in step 265. In step 270, server 110 determines client application 121 is uninstalled on client device 120 as, with no beacon ID, the beacon ID and transaction ID do not match in step 275, as the beacon ID is a null value. Server 110 updates the installation status as "un-installed," in step 280, and the application installation status is monitored or communicated in step 255.

Figure 3:
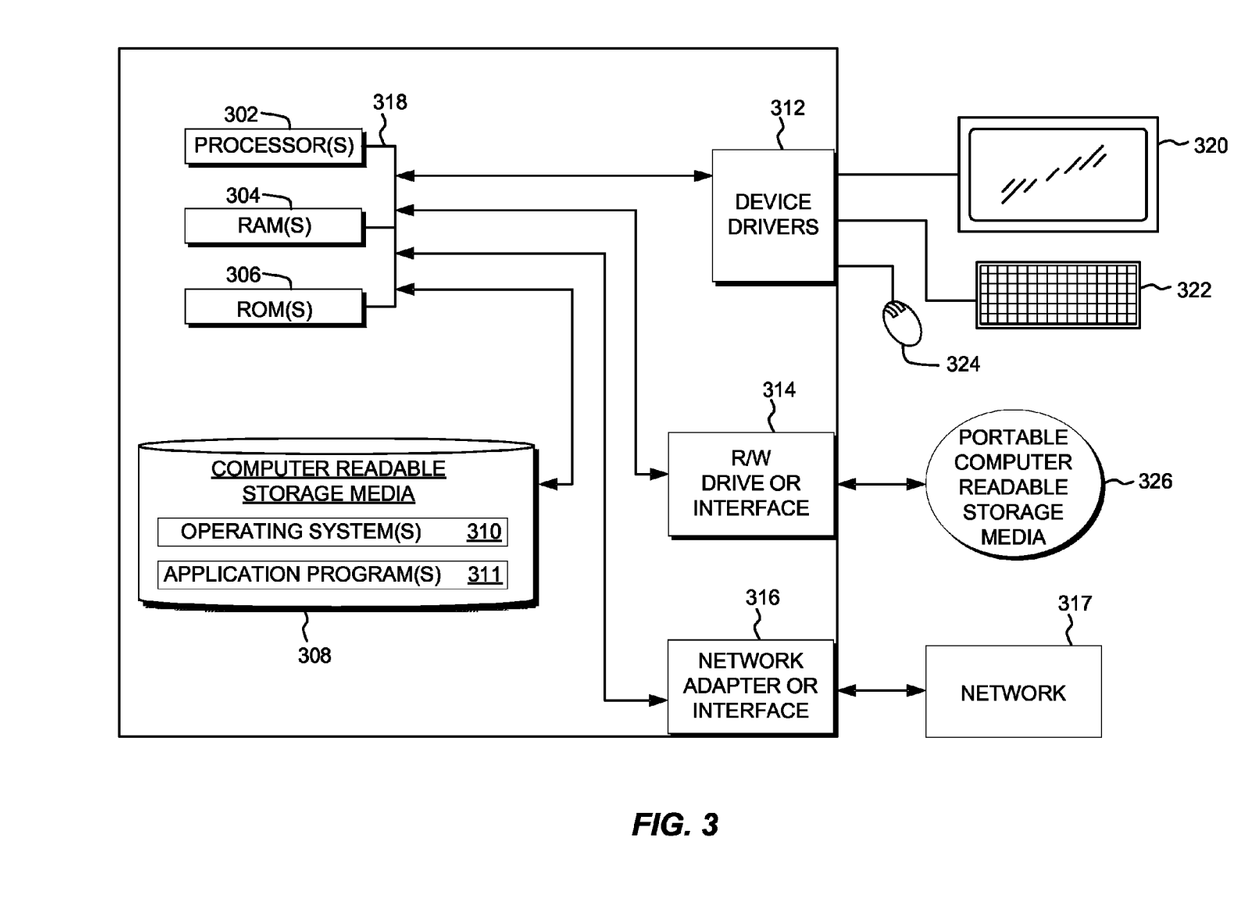
FIG. 3 depicts a block diagram of components of the computer device executing the method, in accordance with an embodiment of the present invention.

Referring to FIG. 3, components of a computing device of distributed data processing environment 100 are depicted, for example, server 110, of FIG. 1, in accordance with an embodiment of the present invention. It should be appreciated that the computing device of the distributed data processing environment shown in FIG. 3 provides only an illustration of one implementation and does not imply any limitations with regard to the environments in which different embodiments may be implemented. Many modifications to the depicted environment may be made.

Server 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 may also include a R/W drive or interface 314 to read from and write to one or more portable computer readable storage media 326. Application programs 311 on server 110 may be stored on one or more of the portable computer readable storage media 326, read via the respective R/W drive or interface 314 and loaded into the respective computer readable storage media 308.

Server 110 may also include a network adapter or interface 316, such as a TCP/IP adapter card or wireless communication adapter (such as a 4G wireless communication adapter using OFDMA technology) for connection to a network 317. Application programs 311 on server 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Server 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

Figure 4:
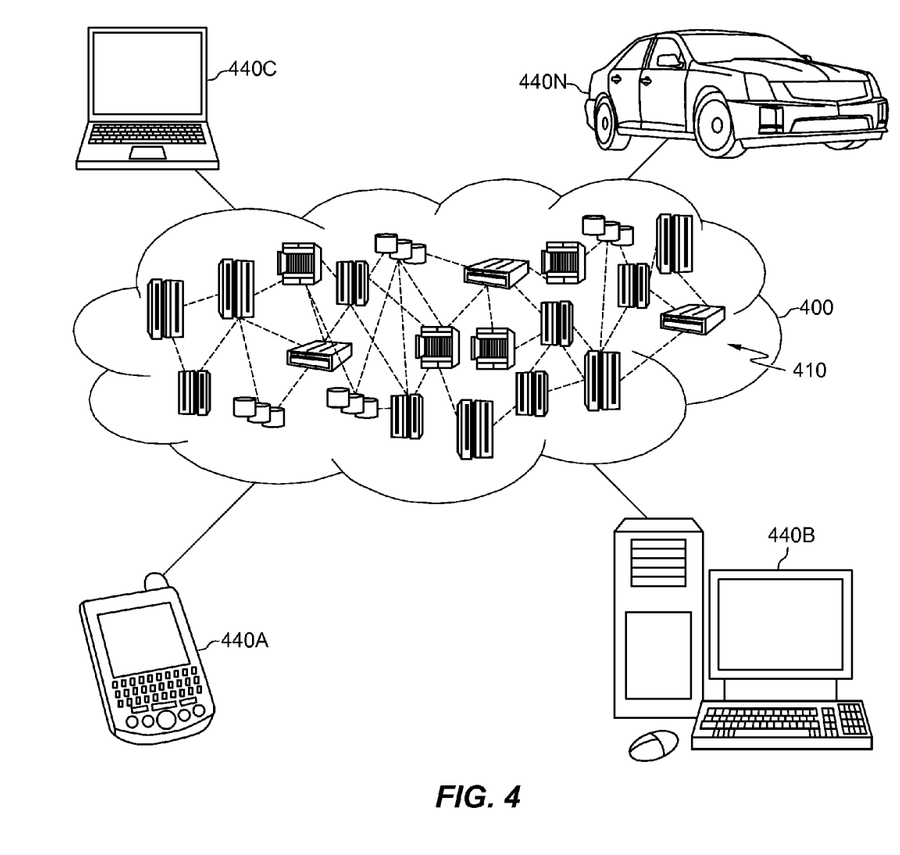
FIG. 4 is a schematic block diagram of an illustrative cloud computing environment, according to an aspect of the present invention.

Referring now to FIG. 4, illustrative cloud computing environment 400 is depicted. As shown, cloud computing environment 400 comprises one or more cloud computing nodes 410 with which local computing devices used by cloud consumers, such as, for example, personal digital assistant (PDA) or cellular telephone 440A, desktop computer 440B, laptop computer 440C, and/or automobile computer system 440N may communicate. Computing nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440A-N shown in FIG. 4 are intended to be illustrative only and that computing nodes 410 and cloud computing environment 400 can communicate with any type of computerized device over any type of network and/or network addressable connection (e.g., using a web browser).

Figure 5:
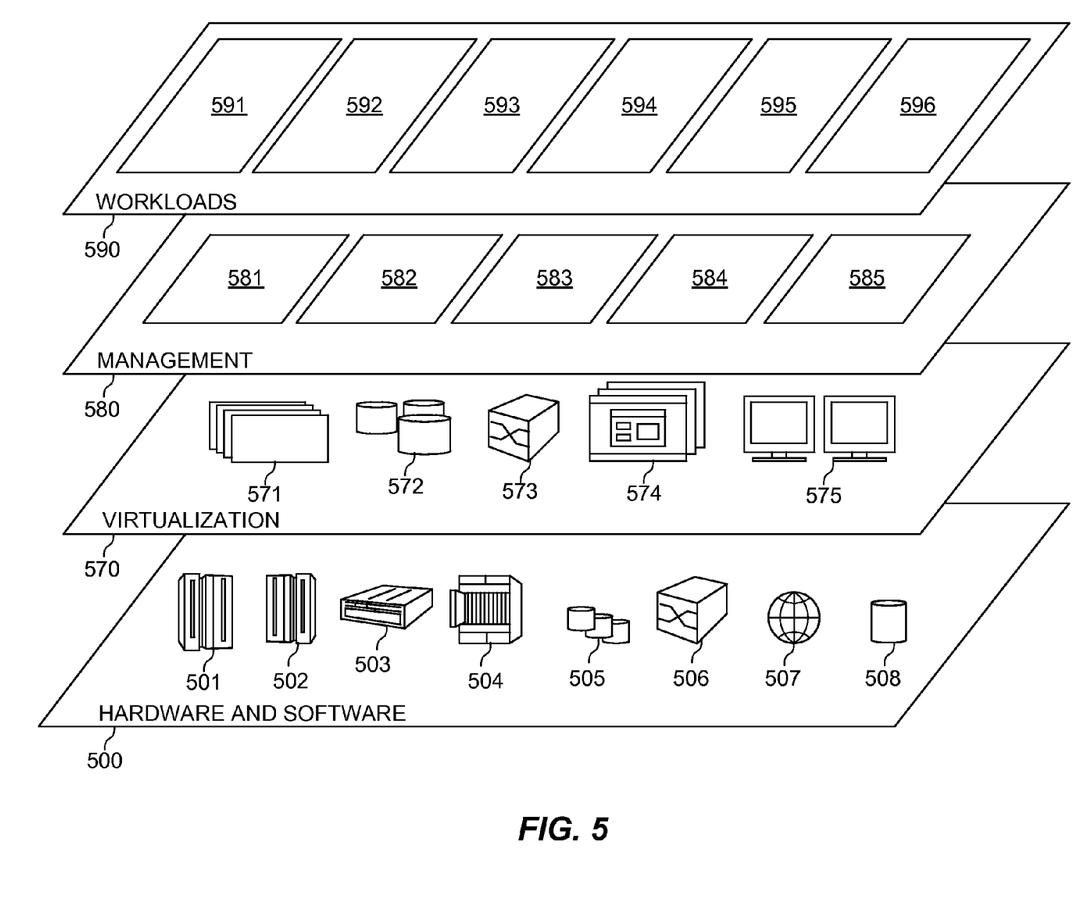
FIG. 5 is a multi-layered functional illustration of the cloud computing environment of FIG. 4, according to an embodiment of the present invention.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 500 includes hardware and software components. Examples of hardware components include: mainframes 501; RISC (Reduced Instruction Set Computer) architecture based servers 502; servers 503; blade servers 504; storage devices 505; and networks and networking components 506. In some embodiments, software components include network application server software 507 and database software 508.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and application installation tracking processing 596.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for determining an installation status of an application, the method comprising:
   receiving a request for a transaction using a computer system; initiating a beacon from the computer system to detect a first user identification of an application;
   determining an absence of the first user identification of the application on a first user device, when the beacon of the computer system does not detect the first user identification within a defined geographical area;
   receiving a plurality of transaction data from a transaction device, in response to receiving the request for the transaction;
   generating a second user identification based on the received transaction data;
   generating an installation status associated with the first user device based on the generated second user identification and the absence of the first user identification; and
   recording the installation status associated with the first user device.

2. The method of claim 1, further comprising:
   detecting the first user identification of the application on the first user device within the defined geographical area using the beacon;
   comparing the detected first user identification and generated second user identification;
   in response to matching the first user identification and the generated second user identification, modifying the installation status of the application on the first user device; and
   communicating the modified installation status.

3. The method of claim 1, wherein receiving the request for the transaction is in response to input from a user via one or more of: a wired input device; and wireless input.

4. The method of claim 1, further comprising: determining an absence of the first user identification of the application on the first user device, in response to receiving the request for the transaction.

5. The method of claim 1, wherein the generated installation status is one or more of: true; and false.

6. The method of claim 1, wherein the transaction data includes the second user identification.

7. The method of claim 1, wherein the beacon is a radio frequency beacon.

8. A device for determining an installation status of an application, which comprises:
   a computer system configured to receive a request for a transaction initiated by a user, the computer system communicating with a transaction device having a user interface;
   a beacon being part of the transaction device and communicating with the computer system, the beacon being configured to detect a first user identification of an application on a first user device entering a defined geographical area;
   the computer system being configured to, receive a plurality of transaction data from the transaction device;
   the computer system further being configured to, in response to receiving the request for the transaction and the beacon not detecting the first user identification of the application on the first user device: generate a second user identification based on the received transaction data, and generate an installation status of the application on the first user device based on the generated second user identification and the absence of the first user identification.

9. The device of claim 8, wherein the computer system is configured to, in response to the beacon detecting the first user identification: detect the first user identification of the application on the first user device within the defined geographical area using the beacon; compare the detected first user identification and generated second user identification; and in response to determining the first user identification and the generated second user identification match, modify the installation status of the application on the first user device; and configured to communicate the modified installation status.

10. The device of claim 8, wherein the computer system includes one or more computer processors; one or more computer-readable storage media; and program instructions stored on the computer-readable storage media for execution by at least one of the one or more processors.

11. The device of claim 10, wherein program instructions further comprise: instructions to generate the installation status of the application on the first user device based on the generated second user identification and the absence of the first user identification.

12. The device of claim 8, wherein the beacon includes a radio frequency beacon.

13. A non-transitory computer program product for determining an installation status of an application, the computer program product comprising:
- one or more computer-readable storage media and program instructions stored on the one or more computer-readable storage media, the program instructions comprising:
  - instructions to receive a request for a transaction using a computer system;
  - instructions to initiate a beacon from the computer system to detect a first user identification of an application;
  - instructions to determine an absence of the first user identification of the application on a first user device, when the beacon of the computer system does not detect the first user identification within a defined geographical area;
  - instructions to receive a plurality of transaction data from a transaction device, in response to receiving the request for the transaction;
  - instructions to generate a second user identification based on the received transaction data;
  - instructions to generate an installation status associated with the first user device based on the generated second user identification and the absence of the first user identification; and
  - instructions to record the installation status associated with the first user device.

14. The computer program product of claim 13, further comprising:
- instructions to detect the first user identification of the application on the first user device within the defined geographical area using the beacon;
- instructions to compare the detected first user identification and generated second user identification;
- in response to instructions to match the first user identification and the generated second user identification, instructions to modify the installation status of the application on the first user device; and
- instructions to communicate the modified installation status.

15. The computer program product of claim 13, wherein instructions to receive the request for the transaction is in response to input from a user via one or more of: a wired input device; and wireless input.

16. The computer program product of claim 13, further comprising instructions to determine an absence of the first user identification of the application on the first user device, in response to instructions to receive the request for the transaction.

17. The computer program product of claim 13, wherein the generated installation status is one or more of: true; and false.

18. The computer program product of claim 13, wherein the transaction data includes the second user identification.

19. The computer program product of claim 13, wherein the beacon is a radio frequency beacon.

* * * * *